Patented Sept. 27, 1938

2,131,245

UNITED STATES PATENT OFFICE 2,131,245

VULCANIZATION OF RUBBER

Ira Williams, Woodstown, N. J., and Frank Rea Mayo, Wilmington, Del., assignors to E. I. du Pont de Nemours & Company, Wilmington, Del., a corporation of Delaware No Drawing. Application August 8, 1935, Serial No. 35,238

20 Claims. (Cl. 18—53)

This invention relates to rubber and more particularly to accelerators for the vulcanization of rubber.

It is well known that the vulcanization of rubber may be accelerated by the addition of various materials to the rubber mix prior to vulcanization. A number of materials are available for such use. These materials fall roughly under the following classes:

(1) Inorganic accelerators such as lime, litharge and caustic soda, or its equivalent such as sodium phenolate.

(2) Organic amines such as alkyl amines, guanidines, aryl amines, quinine and piperidine.

(3) Aldehyde amine reaction products such as acetaldehyde ammonia, hexamethylene tetramine, formaldehyde aniline and butyraldehyde aniline.

(4) Derivatives of acids or acid amides such as zinc ethyl xanthate, diethyl ammonium diethyl dithiocarbamate, lead dithio fuorate, tetra methyl thiuram sulfides, formamide, ureas and thioureas.

(5) Arylene thiazoles such as mercaptobenzothiazole and its derivatives.

It is well known that different types of rubber mixes require the use of different types of accelerating materials having different characteristics. Also, the type of accelerating material to be chosen depends upon the object made from the rubber and the use to which it is to be put. Each of the above classes of accelerators has certain characteristics which makes it suited to particular types of application and the existence of several classes of accelerator makes it possible to select a type most useful for the particular purpose.

An object of the present invention is to provide a new class of accelerating compounds which has new and distinctive characteristics. A further object is to provide accelerators which produce no discoloration or odor in the vulcanized rubber. A still further object is to provide a method for accelerating the vulcanization of rubber. Still other objects are to provide new compositions of matter and to advance the art. Other objects will appear hereinafter.

These objects may be accomplished in accordance with our invention which comprises incorporating into the rubber mix prior to vulcanization a small amount of a certain class of quaternary ammonium compounds which produce little tendency to premature vulcanization in the mix and are relatively free from a tendency to discolor the rubber or to give it a bad odor. This new class of accelerating compounds comprises the quaternary ammonium compounds in which one valence of the nitrogen is satisfied by an anion and each of the remaining valences is satisfied by a distinct carbon atom at least three of which carbon atoms are aliphatic. Two or three of such carbon atoms may be members of a group which form, with the nitrogen, a heterocyclic nucleus as in piperidine which is not strictly an aliphatic compound but the carbon atoms of which are aliphatic in nature. The fourth carbon atom may be aliphatic or aromatic but preferably is aliphatic. The anion may be any salt forming anion selected from the group of inorganic acids, organic carboxylic acids, phenols, alcohols, thiophenols and thioalcohols. By the term "alcohols" as used herein, we mean aliphatic compounds of carbon, hydrogen and oxygen derived from hydrocarbons containing even numbers of hydrogen atoms by substitution of hydroxyl groups for equal numbers of hydrogen atoms. By the term "thioalcohols" as used herein, we means alcohols in which oxygen atoms have been replaced by sulfur atoms.

The compounds of our invention are, in general, well known and may be prepared by any of the various methods described in the literature.

In order to more clearly describe our invention, the preferred modes of carrying the same into effect and the advantageous results to be obtained thereby, the following example is given:

*Example 1*

A base stock was prepared consisting of 100 parts by weight of smoked sheet rubber, 25 parts of carbon black, 5 parts of zinc oxide, 3 parts of stearic acid and 3 parts of sulfur. To this compound 1 part of accelerator was added and the compound was vulcanized at 227° F. and at 287° F. after which the physical properties were determined.

| Accelerating material | Lbs./in.² at 500 percent elongation ||||| 
|---|---|---|---|---|---|
| | Min. cure at 227° F. || Min. cure at 287° F. |||
| | 30 | 60 | 20 | 30 | 60 |
| Tetra methyl ammonium chloride | 150 | 250 | 1,475 | 1,775 | 2,300 |
| Tetra ethyl ammonium bromide | 75 | 150 | 1,375 | 1,625 | 2,325 |
| Ethyl trimethyl ammonium chloride | 50 | 475 | 1,900 | 2,150 | 2,675 |
| Benzyl trimethyl ammonium chloride | 50 | 325 | 1,550 | 1,800 | 2,325 |
| Cetyl trimethyl ammonium bromide | | 25 | 1,300 | 1,600 | 2,225 |
| Methyl ethyl piperidinium chloride | 225 | 425 | 1,800 | 2,100 | 2,700 |
| Dimethyl piperidinium formate | | 50 | 1,575 | 2,050 | 2,625 |
| Dimethyl benzyl cyclohexyl ammonium chloride | | 75 | 1,425 | 1,800 | 2,375 |
| Dimethyl phenyl cyclohexyl ammonium chloride | | 25 | | 125 | 250 |
| p-Lauroxy-phenyl trimethyl ammonium methyl sulfate | | | 700 | 875 | 1,175 |
| Dimethyl piperidinium thiocyanate | Undercured | | 1,125 | 1,475 | 1,975 |
| Dimethyl piperidinium hydrosulfide | 275 | 550 | 2,275 | 2,600 | 2,875 |
| Tetra ethyl ammonium formate | 25 | 175 | 1,850 | 2,125 | 2,550 |
| Tetra ethyl ammonium stearate | | 25 | 1,575 | 1,775 | 2,250 |
| Tetra ethyl ammonium benzoate | | 50 | 1,600 | 1,825 | 2,325 |
| Tetra ethyl ammonium phenolate | 25 | 150 | 1,800 | 2,125 | 2,475 |

It is evident from the above results that a rather wide variety of physical results are obtainable and that the activity at low temperatures is not sufficiently great to cause difficulty in processing the rubber containing these accelerators.

We have also found, that these accelerators, when milled into white mixes do not cause discoloration either during or after vulcanization and do not produce an unpleasant odor.

It is evident that the organic groups attached to the pentavalent nitrogen may be greatly varied and that compounds having many combinations of these organic radicles may be employed. Some of the organic radicles that are satisfactory and may be attached to the pentavalent nitrogen are methyl, ethyl, propyl, isopropyl, N-butyl, isobutyl, amyl, iso-amyl and other straight, or branched chain aliphatic groups which may be substituted with such groups as hydroxyl, halogens, amines, sulfhydryl, ether, sulfide, or other groups. Also, such organic radicles may be any of the various aralkyl and heterocyclic organic radicles such as benzyl, phenylethyl, naphthylmethyl, naphthylethyl, biphenylmethyl, biphenylethyl, anthracylmethyl, piperidyl, morpholyl and the like.

As heretofore indicated, one of the carbon atoms attached to the pentavalent nitrogens may be in an aromatic ring. Suitable aromatic rings are phenyl, tolyl, xylyl, xenyl or other substituted phenyl groups, naphthyl, substituted naphthyl, anthracyl, substituted anthracyl and higher aromatic groups.

The anion is also subject to wide variation and may consist of such negative groups as phenoxy, alkoxy or sulfide which may constitute various organic groups connected to the nitrogen by means of sulfur such as thiophenol, thioalcohol or various organic carboxylic acids such as acetic acid, chloracetic acid, propionic acid, butyric acid, oxalic acid, palmitic acid, oleic acid, tartaric acid, maleic acid, phthalic acid, benzoic acid and the like. Or the anion may be inorganic such as phosphate, nitrate, cyanide, carbamate, carbonate, bicarbonate, and sulfhydryl radicles.

In general, it is desirable, especially when the product is to be employed in the presence of moisture, to employ the negative ion of an acid stronger than water for the preparation of the quaternary ammonium compound.

While we have disclosed the preferred embodiments of our invention, it will be readily apparent that many variations and modifications may be made therein without departing from the spirit of our invention. Accordingly, the scope of our invention is to be limited solely by the appended claims construed as broadly as is permissible in view of the prior art.

We claim:

1. The method of vulcanizing rubber which comprises incorporating into the rubber mix prior to vulcanization, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct carbon atom at least three of which are aliphatic.

2. The method of vulcanizing rubber which comprises incorporating into the rubber mix prior to vulcanization, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct carbon atom, at least three of the carbon atoms being aliphatic and not more than two of them forming part of a heterocyclic nucleus.

3. The method of vulcanizing rubber which comprises incorporating into the rubber mix prior to vulcanization, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct aliphatic carbon atom not more than two of which form with the nitrogen part of a heterocyclic nucleus.

4. The method of vulcanizing rubber which comprises incorporating into the rubber mix prior to vulcanization, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct aliphatic carbon atom in a separate and distinct aliphatic group.

5. The method of vulcanizing rubber which comprises incorporating into the rubber mix prior to vulcanization, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct carbon atom, at least three of the carbon atoms being aliphatic and not more than two of them forming with the nitrogen part of a heterocyclic nucleus, all of the groups, other than the anion, attached to the nitrogen consisting of carbon and hydrogen.

6. The method of vulcanizing rubber which comprises incorporating into the rubber mix prior to vulcanization, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct aliphatic carbon atom not more than two of which form with the nitrogen part of a heterocyclic nucleus, all of the groups, other than the anion, attached to the nitrogen consisting of carbon and hydrogen.

7. The method of vulcanizing rubber which comprises incorporating into the rubber mix prior to vulcanization, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct aliphatic carbon atom in a separate and distinct aliphatic hydrocarbon group.

8. Rubber having incorporated therein as a vulcanization accelerator, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct carbon atom at least three of which are aliphatic.

9. Rubber having incorporated therein as a vulcanization accelerator, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct carbon atom, at least three of the carbon atoms being aliphatic and not more than two of them forming with the nitrogen part of a heterocyclic nucleus.

10. Rubber having incorporated therein as a vulcanization accelerator, a small amount of a quaternary ammonium compound in which one valence of the nitrogen is satisfied by an anion derived from the group consisting of inorganic acids, organic carboxylic acids, phenols, alcohols, thio phenols and thio alcohols and each of the remaining valences is satisfied by a distinct aliphatic carbon atom not more than two of which form with the nitrogen part of a heterocyclic nucleus.

11. Rubber having incorporated therein as a vulcanization accelerator a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct aliphatic carbon atom in a separate and distinct aliphatic group.

12. Rubber having incorporated therein as a vulcanization accelerator, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct carbon atom, at least three of the carbon atoms being aliphatic and not more than two of them forming with the nitrogen part of a heterocyclic nucleus, all of the groups, other than the anion, attached to the nitrogen consisting of carbon and hydrogen.

13. Rubber having incorporated therein as a vulcanization accelerator, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct aliphatic carbon atom not more than two of which form with the nitrogen part of a heterocyclic nucleus, all of the groups, other than the anion, attached to the nitrogen consisting of carbon and hydrogen.

14. Rubber having incorporated therein as a vulcanization accelerator, a small amount of a quaternary ammonium compound in which one valence of the nitrogen is satisfied by an anion derived from the group consisting of inorganic acids, organic carboxylic acids, phenols, alcohols, thio phenols and thio alcohols, and each of the remaining valences is satisfied by a distinct aliphatic carbon atom in a separate and distinct aliphatic hydrocarbon group.

15. The method of vulcanizing rubber which comprises incorporating into the rubber mix prior to vulcanization, a small amount of tetra methyl ammonium chloride.

16. The method of vulcanizing rubber which comprises incorporating into the rubber mix prior to vulcanization, a small amount of tetra ethyl ammonium formate.

17. The method of vulcanizing rubber which comprises incorporating into the rubber mix prior to vulcanization, a small amount of dimethyl piperidinium formate.

18. Rubber having incorporated therein as a vulcanization accelerator a small amount of tetra methyl ammonium chloride.

19. Rubber having incorporated therein as a vulcanization accelerator a small amount of tetra ethyl ammonium formate.

20. Rubber having incorporated therein as a vulcanization accelerator dimethyl piperidinium formate.

IRA WILLIAMS.
FRANK REA MAYO.